(12) United States Patent
Kim et al.

(10) Patent No.: US 7,452,432 B2
(45) Date of Patent: Nov. 18, 2008

(54) APPARATUS FOR AND METHOD OF BONDING NANO-TIP USING ELECTROCHEMICAL ETCHING

(75) Inventors: Soo Hyun Kim, Daejeon (KR); Jun Sok Lee, Daejeon (KR); Jai Seong Choi, Seoul (KR); Gyung Soo Kang, Gwangju (KR)

(73) Assignee: Korean Advanced Institute of Science and Technology, Daejeon (KR)

( * ) Notice: Subject to any disclaimer, the term of this patent is extended or adjusted under 35 U.S.C. 154(b) by 573 days.

(21) Appl. No.: 11/138,772

(22) Filed: May 26, 2005

(65) Prior Publication Data
US 2006/0102271 A1 May 18, 2006

(30) Foreign Application Priority Data
Nov. 12, 2004 (KR) ............... 10-2004-0092387

(51) Int. Cl.
*B32B 41/00* (2006.01)
(52) U.S. Cl. ............ 156/64; 156/296; 156/367; 156/368; 156/379.6; 977/851; 977/856; 977/876; 977/882; 977/896

(58) Field of Classification Search ............ 156/64, 156/296, 367, 368, 379.6; 977/856, 864, 977/876, 896, 882
See application file for complete search history.

(56) References Cited

OTHER PUBLICATIONS

Akita et al., Carbon Nanotude Tips for a Scanning Probe Microscope: Their Fabrication and Properties, J. Phys. D: Appl. Phys. 32 (1999), pp. 1044-1048.

*Primary Examiner*—George R Kock, III
(74) *Attorney, Agent, or Firm*—Allen, Dyer, Doppelt, Milbrath & Gilchrist, P.A.

(57) ABSTRACT

Disclosed herein are an apparatus for and a method of bonding a nano-tip using electrochemical etching, in which a good bonding stability can be provided. The nano-tip bonding apparatus comprises a glass plate having a top surface of a certain desired area. An electrolytic solution having conductivity is placed on the top surface of the glass plate by means of surface tension. Means for moving reciprocally a base material having conductivity in opposite direction is provided. A carbon nano-tube is adhered to a pointed tip of the base material by means of an adhesive. An end portion of the carbon nano-tube is to be immersed in the electrolytic solution. A power supply is provided for applying an electric power to the electrolytic solution and the base material.

9 Claims, 4 Drawing Sheets

APPARATUS FOR AND METHOD OF BONDING NANO-TIP USING ELECTROCHEMICAL ETCHING

BACKGROUND OF THE INVENTION

1. Field of the Invention

The present invention relates to an apparatus for and a method of bonding a nano-tip using electrochemical etching, in which a good bonding stability can be provided.

2. Background of the Related Art

In order to handle a nano-sized object, generally the tools therefor must also have a resolution on the order of nanometers. It is therefore necessary in the nano industry to develop a nano-probe (a micro tip).

A suitable solution to improve the bonding stability of a carbon nano-tube has rarely been proposed. Conventionally, first, a nano probe is fabricated and then put inside a scanning electron microscope. Thereafter, electron beam is radiated on the bonding area and at this time amorphous carbon inside the scanning electron microscope is vapor-deposited in the bonding area, thereby enhancing the bonding force.

In the above conventional technique, however, an additional process is needed to improve the bonding stability, and high-priced equipment such as the scanning electron microscope is necessarily required. In addition, unnecessary amorphous carbon is deposited on the surface of a carbon nano-tube.

SUMMARY OF THE INVENTION

Therefore, the present invention has been made in view of the above problems occurring in the prior art, and it is an object of the present invention to provide an apparatus for and a method of bonding a nano-tip using electrochemical etching, in which a good bonding stability between a carbon nano-tube and a base material can be provided.

Another object of the invention is to provide an apparatus for and a method of bonding a nano-tip using electrochemical etching, in which a good bonding stability can be achieved for a separate nano-probe.

To accomplish the above object, according to one aspect of the present invention, there is provided an apparatus for bonding a nano-tip using electrochemical etching. The apparatus of the invention includes: a) a glass plate having a top surface of a certain desired area; b) an electrolytic solution placed on the top surface of the glass plate by means of surface tension, the electrolytic solution having a conductivity; c) means for moving reciprocally a base material having a conductivity in one direction; d) a carbon nano-tube adhered to a pointed tip of the base material by means of an adhesive, an end portion of the carbon nano-tube being to be immersed in the electrolytic solution; and e) a power supply for applying an electric power to the electrolytic solution and the base material.

The moving means may include a nano stage capable of reciprocally moving in the direction of X-axis on the order of several to several tens nanometers resolution.

Preferably, the power supply supplies a direct electric power and an ampere meter is further connected in series thereto.

The adhesive may include an acrylic adhesive.

In addition, the base material may include a micro tip containing tungsten.

The above apparatus of the invention may further comprise a sensing unit, which is installed above an area where the end portion of the carbon nano tube is immersed into the electrolytic solution.

Here, the sensing unit may include an optical microscope or a scanning electron microscope.

According to another aspect of the invention, there is provided a method of bonding a nano-tip using electrochemical etching. The method of the invention includes the steps of: a) attaching a carbon nano tube at an end portion of a base material coated with an adhesive; b) applying an electric power to a conductive electrolytic solution placed on a top surface of a glass plate by means of surface tension, and to the base material; c) moving the base material in one direction such that the end portion of the carbon nano tube is immersed into the electrolytic solution, thereby flowing an electric current; d) melting the adhesive using the heat generated by resistance of the adhesive according to the electric current; and e) solidifying the melted adhesive to thereby bond the carbon nano tube when the electric current is shut off to end the electrolytic action.

Preferably, the above method of the invention may further includes a step of observing using a microscope the area where the end portion of the carbon nano tube is immersed into the electrolytic solution.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

The preferred embodiments of the invention will be hereafter described in detail, with reference to the accompanying drawings.

Figure 1:
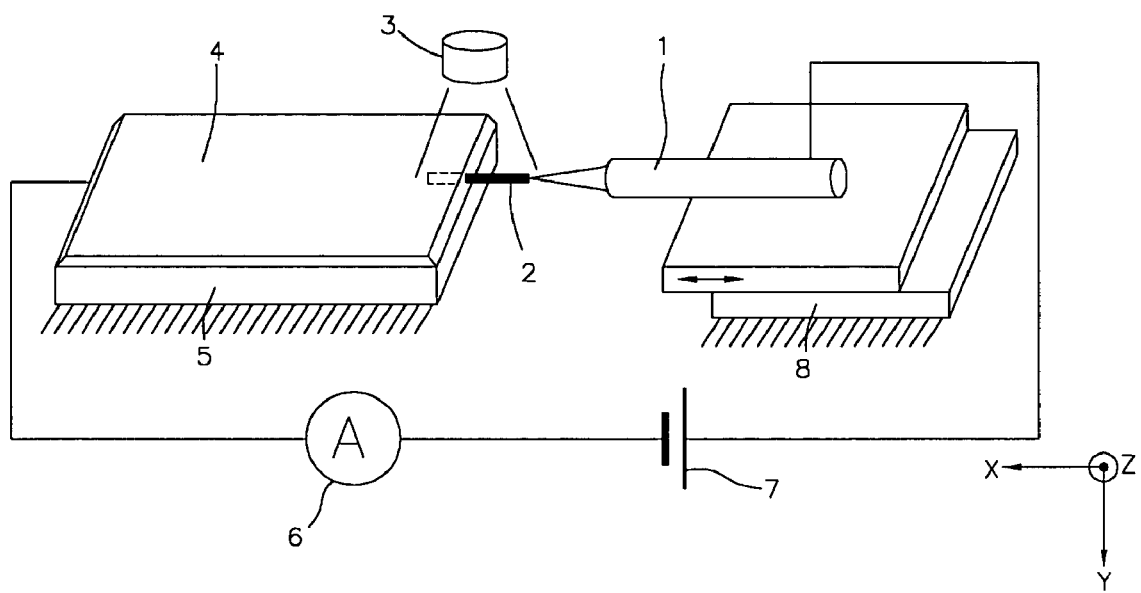
FIG. 1 is a schematic perspective view of a nano-tip bonding apparatus using electrochemical etching according to the present invention.

FIG. 1 is a schematic perspective view of a nano-tip bonding apparatus using electrochemical etching according to an embodiment of the invention. Referring to FIG. 1, the nano-tip bonding apparatus of the invention comprises generally a glass plate 5 and a nano stage 8.

The glass plate 5 is electrically non-conductive and placed horizontally. The glass plate 5 has a flat top surface. On the top surface of the glass plate 5 is placed an electrolytic solution 4 in a certain desired thickness. The electrolytic solution 4 is not retained in a separate container, but held in place by the surface tension on top of the glass plate 5. An electrode is immersed in one side of the electrolytic solution 4, to which thereby a direct electric power can be applied.

On top of the nano stage 8 is placed a base material 1. The nano stage 8 is configured such that the base material 1 can move reciprocally towards and away from the glass plate 5 in a resolution of several nanometers. The driving unit for the nano stage 8 is well known to those skilled in the art and thus details thereon will not be described here.

The base material 1 may be exemplified by a micro-tip formed of tungsten, which is mounted on the nano stage 8 so as to enable to reciprocally move towards and away from the glass plate 5.

The base material 1 has typically a cylindrical shape with a sharp tip, to which a carbon nano-tube 2 is attached.

A sensing unit 3 is provided above the place where the carbon nano-tube 2 is immersed into the electrolytic solution 4, and functions to observe them. Typically, the sensing unit 3 employs an optical microscope or a scanning electron microscope (SEM).

A power supply 7 is provided so as to be able to supply direct power of several tens volts, and an ampere meter 6 is connected in series with the power supply 7 to measure the amount of current.

Figure 2:
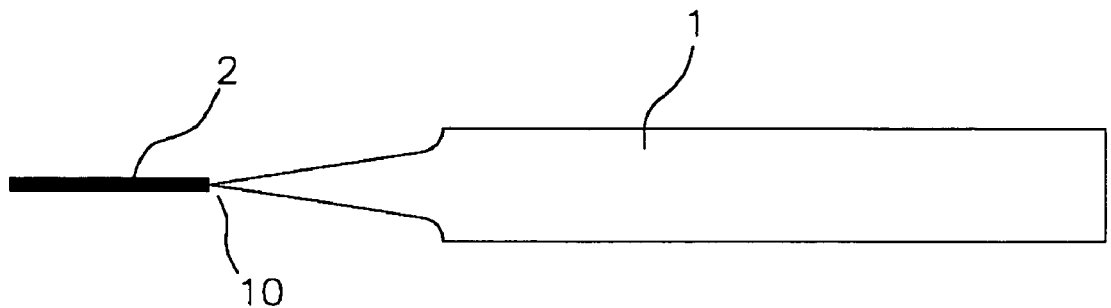
FIG. 2 is an enlarged view of the base material and the carbon nano tube in FIG. 1.

FIG. 2 is an enlarged view of the base material 1 and the carbon nano tube 2 in FIG. 1. As shown in FIG. 2, an adhesive 10 is coated between the carbon nano tube and the base material 1, and the adhesive 10 may be exemplified by a high resistance acrylic adhesive.

Hereinafter, a method of bonding a nano-tip using the nano-tip bonding apparatus of the invention is explained in detail First, on the tip of the base material 1 is coated an acrylic adhesive, to which a carbon nano tube 2 is attached. Thereafter, a direct electric power (minus) is applied to the conductive electrolytic solution 4, which is placed in held on the glass plate 5 by means of the surface tension. Also, the direct power (plus) is applied to the base material 1. In the state, since the circuit is opened, electric current does not flow. Next, the nano stage 8 is moved gradually in the direction of X-axis. Here, the nano stage 8 is configured to move on the order of several nanometers. This is because the carbon nano tube is very short. Such a fine movement can be observed with naked eyes through the sensing unit 3.

The nano stage 8 continues to move towards the glass plate 5 until the end tip of the carbon nano tube 2 is immersed into the electrolytic solution 4. Then, electric current starts to flow and thus an electrolytic action is performed.

That is, as the electric current continues to flow, a resistant heat is generated intensively at the adhesive 10 due to the electrical resistance thereof. Since the base material 1 and the electrolytic solution 4 are conductive materials having a very low resistance, the heat generation is occurred intensively at the area of the adhesive 10. Thus, the generated heat melts the adhesive 10.

Thereafter, as the electrolytic action ends and the electric current is interrupted, the melted adhesive 10 is solidified so that the carbon nano tube 2 is firmly bonded to the base material 1. The starting and ending points of the electrolytic action can be recognized through the measured value from the ampere meter 6.

Hereafter, the bonding stability of a carbon nano tube bonded according to the present invention is compared with a conventional one, through enlarged photographs.

Figure 3:
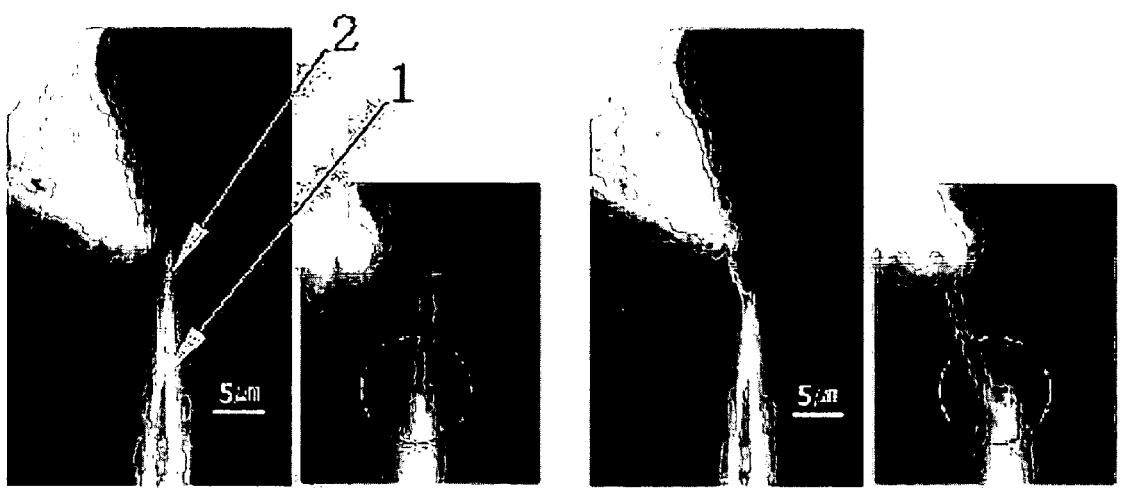
FIG. 3 is an enlarged photograph of a nano-tip fabricated according to a conventional technique, showing a low bonding stability.

First, FIG. 3 is an enlarged photograph of a nano tip bonded by a conventional technique, which shows a very poor bonding stability. Four pieces of photographs of FIG. 3 will be explained from the left to the right in sequence.

The leftmost photograph in FIG. 3 shows an initial state where a nano-tip is approached, but electric voltage is not applied. The second from the left is a partially enlarged photograph of the above. The third photograph from the left shows a state where an electric voltage is applied and the carbon nano tube is bent. The rightmost one is a partially enlarged photograph showing the bent carbon nano-tube. As shown in the rightmost photograph, the conventional nano-tip does not provide a good bonding stability between the base material 1 and the carbon nano-tube 2 and thus a slight movement such as a bending may lead to a failure of the bonding region.

Figure 4:
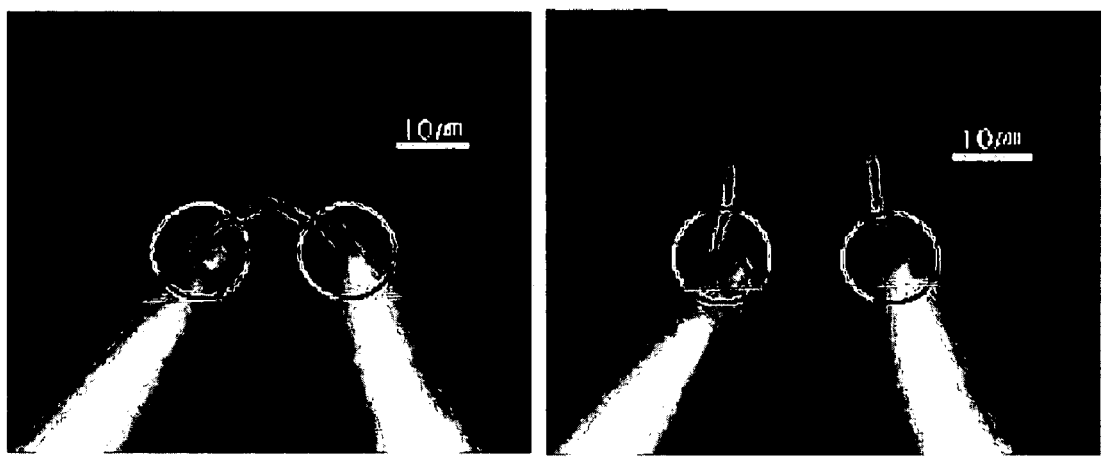
FIG. 4 is an enlarged photograph of a nano-tip fabricated according to the present invention, showing a high bonding stability.

FIG. 4 is an enlarged photograph showing a carbon nano-tip bonded according to the present invention, which has a good bonding stability. That is, the left photograph in FIG. 4 shows a state where two nano-tips 2 are approached to each other and an electric power is applied thereto so that the two nano-tubes are symmetrically bent. The right photograph in FIG. 4 shows a state where the electric power is shut off at the bent state of the nano-tube. It can be seen from the right photograph that the carbon nano-tube 2 is recovered into its initial state (inside the circle). That is, the carbon nano-tube according to the invention provides a good bonding stability between the nano-tube 2 and the base material 1, thereby enabling to recover into the initial state thereof after bending.

As described above, the nano-tip bonding apparatus and method of the invention can improve significantly the bonding stability between a carbon nano-tube and a base material, using electrolytic action.

In addition, the bonding stability of a separate nano-probe can be enhanced.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An apparatus for bonding a nano-tip using electrochemical etching, the apparatus comprising:
   a) a glass plate having a top surface of a certain desired area;
   b) an electrolytic solution placed on the top surface of the glass plate by means of surface tension, the electrolytic solution having a conductivity;
   c) means for moving reciprocally a base material having a conductivity in one direction;
   d) a carbon nano-tube adhered to a pointed tip of the base material by means of an adhesive, an end portion of the carbon nano-tube being to be immersed in the electrolytic solution; and
   e) a power supply for applying an electric power to the electrolytic solution and the base material.

2. The apparatus according to claim 1, wherein the moving means includes a nano stage capable of reciprocally moving in the direction of X-axis on the order of several to several tens nanometers resolution.

3. The apparatus according to claim 1, wherein the power supply supplies a direct electric power and an ampere meter is further connected in series thereto.

4. The apparatus according to claim 1, wherein the adhesive includes an acrylic adhesive.

5. The apparatus according to claim 1, wherein the base material includes a micro tip containing tungsten.

6. The apparatus according to claim 1, further comprising a sensing unit, which is installed above an area where the end portion of the carbon nano tube is immersed into the electrolytic solution.

7. The apparatus according to claim 6, wherein the sensing unit includes an optical microscope or a scanning electron microscope.

8. A method of bonding a nano-tip using electrochemical etching, the method comprising steps of:
   a) attaching a carbon nano tube at an end portion of a base material coated with an adhesive;

b) applying an electric power to a conductive electrolytic solution placed on a top surface of a glass plate by means of surface tension, and to the base material;
c) moving the base material in one direction such that the end portion of the carbon nano tube is immersed into the electrolytic solution, thereby flowing an electric current;
d) melting the adhesive using the heat generated by resistance of the adhesive according to the electric current; and
e) solidifying the melted adhesive to thereby bond the carbon nano tube when the electric current is shut off to end the electrolytic action.

9. The method according to claim 8, wherein the steps d) and e) further includes a step of observing using a microscope the area where the end portion of the carbon nano tube is immersed into the electrolytic solution.

* * * * *